United States Patent
Bartolucci et al.

(10) Patent No.: US 11,831,761 B2
(45) Date of Patent: Nov. 28, 2023

(54) COMPUTER-IMPLEMENTED SYSTEMS AND METHODS FOR AN ACCUMULATOR-BASED PROTOCOL FOR THE DISTRIBUTION OF TASKS ACROSS A COMPUTER NETWORK

(71) Applicant: nChain Licensing AG, Zug (CH)

(72) Inventors: Silvia Bartolucci, London (GB); Pauline Bernat, London (GB)

(73) Assignee: nChain Licensing AG, Zug (CH)

( * ) Notice: Subject to any disclaimer, the term of this patent is extended or adjusted under 35 U.S.C. 154(b) by 407 days.

(21) Appl. No.: 17/260,915

(22) PCT Filed: Jul. 8, 2019

(86) PCT No.: PCT/IB2019/055800
§ 371 (c)(1),
(2) Date: Jan. 15, 2021

(87) PCT Pub. No.: WO2020/016700
PCT Pub. Date: Jan. 23, 2020

(65) Prior Publication Data
US 2021/0336776 A1    Oct. 28, 2021

(30) Foreign Application Priority Data
Jul. 17, 2018   (GB) ...................... 1811672

(51) Int. Cl.
*H04L 29/06* (2006.01)
*H04L 9/08* (2006.01)
(Continued)

(52) U.S. Cl.
CPC ............ *H04L 9/0836* (2013.01); *G06F 9/466* (2013.01); *H04L 9/085* (2013.01); *H04L 9/50* (2022.05)

(58) Field of Classification Search
CPC ......... H04L 9/0836; H04L 9/085; H04L 9/50; H04L 9/3073; H04L 2209/56; H04L 9/3239; H04L 63/062; G06F 9/466
See application file for complete search history.

(56) References Cited

U.S. PATENT DOCUMENTS 9,900,160 B1 *   2/2018  Barbour .............. H04L 63/126
10,841,372 B1 * 11/2020  Ram .................... H04L 65/80
(Continued)

FOREIGN PATENT DOCUMENTS

WO    2017145007 A1    8/2017

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Harunur Rashid
(74) *Attorney, Agent, or Firm* — Davis Wright Tremaine LLP

(57) ABSTRACT

Techniques described herein can be utilized to implement a protocol for performing an unbiased selection of a particular worker node among a plurality of worker nodes to execute a computational task. Nodes of a distributed network may register to join a group membership by generating quantities derived at least in part from a hierarchical data structure, such as an accumulation tree, whose parameters are defined by a manager node. The manager node may utilise the quantities provided by the plurality of worker nodes to perform an unbiased selection of a worker node from among the plurality of worker nodes to perform a computational task. The invention is particularly suited, but not limited to, for use in a blockchain network such as Bitcoin. In at least some cases, the manager node cannot determine, based on quantities supplied by the worker nodes, whether a particu-
(Continued)

lar worker node was selected to perform the computational task.

17 Claims, 10 Drawing Sheets

(51) Int. Cl.
*G06F 9/46* (2006.01)
*H04L 9/00* (2022.01)

(56) References Cited

U.S. PATENT DOCUMENTS

2010/0287377 A1* 11/2010 Lim ................. H04L 9/3247
                                                    713/176
2017/0180469 A1* 6/2017 Ford ................. H04L 67/1008
2017/0289111 A1* 10/2017 Voell ................. H04L 9/3236

OTHER PUBLICATIONS

International Search Report and Written Opinion dated Sep. 20, 2019, Patent Application No. PCT/IB2019/055800, 13 pages.
Nakamoto, "Bitcoin: A Peer-to-Peer Electronic Cash System," Bitcoin, Oct. 31, 2008, https://bitcoin.org/bitcoin.pdf, 9 pages.
Panwar et al., "Hierarchal Data Storage Using NAI Indexing," International Conference on Advances in Computing, Communication & Automation (ICACCA), Sep. 2017, 8 pages.
Satoshi et al., "Connection Limits," Bitcoin Forum, Aug. 9, 2010, https://bitcointalk.org/index.php?topic=741.0; prev_next=prev, 2 pages.
UK IPO Search Report dated Dec. 17, 2018, Patent Application No. GB1811672.3, 3 pages.

* cited by examiner

COMPUTER-IMPLEMENTED SYSTEMS AND METHODS FOR AN ACCUMULATOR-BASED PROTOCOL FOR THE DISTRIBUTION OF TASKS ACROSS A COMPUTER NETWORK

FIELD OF INVENTION

This invention relates generally to a protocol for distributing the allocation of computational tasks within a plurality of computing nodes, referred to herein as worker nodes in a computer network. As part of the protocol, nodes of a distributed network may register to join a group membership by generating quantities derived at least in part from an accumulation tree whose parameters are defined by a manager node. The manager node may, as part of the protocol, utilise the quantities provided by the plurality of worker nodes to perform an unbiased selection of a worker node from among the plurality of worker nodes to perform a computational task (e.g., execute a computer program). The invention is particularly suited, but not limited to, for use in a blockchain network. In at least some cases, the manager node cannot determine, based on quantities supplied by the worker nodes, whether a particular worker node was selected to perform the computational task.

BACKGROUND OF INVENTION

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing, etc.) while being more versatile in their applications.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. The term "Bitcoin" is used herein to include any version or variation that derives from or is based on the Bitcoin protocol.

SUMMARY OF INVENTION

Thus, it is desirable to provide computationally verifiable assurances that, in a distributed network such as a blockchain network, that computational tasks are being fairly distributed across nodes of the network (i.e., computational tasks are being distributed in an unbiased manner). For example, it may be useful and advantageous to utilise a selection process in which the node that performs the selection cannot foresee, based on quantities supplied by a plurality of worker nodes, whether a particular node was selected to perform the computational task until after the computational task is completed.

Such an improved solution has now been devised.

In accordance with the invention there may be provided a computer-implemented method for a node of a blockchain network. The method may be cryptographically enforced. The computer-implemented method may comprise: detecting that a plurality of transactions on a blockchain satisfies a condition, wherein the plurality of transactions comprises a first transaction corresponding to a first public key and a second public key, wherein the first public key encodes a first set of elements of a hierarchical data structure; generating a third public key based on a second set of elements of the hierarchical data structure; generating a second transaction based at least in part on the first public key, the second public key, and the third public key, wherein the second transaction encodes at least part of a computational task; and contingent upon the first set of elements matching the second set of elements, causing a node of the blockchain to execute the computational task by at least verifying that the node has access to a first private key and a second private key, wherein the first private key and the first public key form a first key pair and the second private key and the second public key form a second key pair.

The method may be used to fairly and/or substantially evenly distribute computational task across nodes of a distributed network. This gives rise to technical advantages relating to efficiency and resource allocation.

Preferably, verifying that the node has access to the first private key and the second private key comprises verifying that the first private key and the second private key satisfy a modulus relationship.

Preferably, the first public key, the second public key, and the third public key refer to points on an elliptic curve. In some cases, some combination of one or more of the first public key, the second public key, and the third public key corresponds represent points on an elliptic curve.

It is also desirable for the method to further comprise making available a set of parameters usable to determine a structure of the hierarchal data structure. The set of parameters usable to determine a structure of the hierarchal data structure may be made available to nodes of a blockchain network.

Preferably, the hierarchal data structure is an accumulation tree such as a bilinear-map accumulation tree.

Preferably, the condition is a threshold time passing, wherein the threshold time is indicated in the set of parameters.

Preferably, the condition is the plurality of transactions reaching a maximum threshold number.

Preferably, the hierarchical data structure is an accumulation tree; and a number of leaf nodes of the accumulation tree, a number of elements in the first set of elements, and the maximum threshold number are collectively determined based at least in part on a probability that two or more transactions of the plurality of transactions encode a same set of elements.

Preferably, the second transaction encumbers a set of digital assets, wherein the set of digital assets is determined based at least in part on digital assets encumbered by each of the plurality of transactions; and the computational task, if executed, transfers control of at least part of the set of digital assets.

The method may further comprise, based on detecting satisfaction of the condition, broadcasting an assurance to generate the second transaction, wherein the assurance encumbers a second set of digital assets based on the digital assets encumbered by each of the plurality of transactions.

Preferably, transactions of the plurality of transactions are broadcast to the blockchain by different nodes of the blockchain.

In some cases, at least two transactions of the plurality of transactions are broadcast to the blockchain by a node of the blockchain. In other words, a particular blockchain may broadcast, to the blockchain, at least two transaction of the plurality of transactions.

Advantageously, the computational task is to be executed within a specified time duration.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Techniques described herein can be utilized to implement a protocol for registering a plurality of worker nodes to a membership/association and utilising an accumulation tree as part of a process for performing an unbiased selection of a particular worker node among the plurality of worker nodes to execute a computational task. In an embodiment, the system performing the unbiased selection (e.g., a manager node) cannot foresee, based on quantities supplied by the worker nodes (e.g., via the blockchain), whether a particular worker node was selected to perform the computational task until an execution transaction is confirmed on the blockchain. By utilising this protocol, worker nodes may have computationally verifiable assurances that the manager node is not able to repeatedly generate randomized quantities until a desired outcome is reached (e.g., performing a biased selection that results in a particular worker node, known a priori, to perform the computational task). Accordingly, techniques described herein may improve the operation of computer systems by providing for a protocol that ensures, in a computationally verifiable manner, the unbiased delegation of computational tasks among a plurality of nodes (e.g., ensuring fair/unbiased delegation of computational work in a distributed system). Techniques described herein may also be utilised to improve the security of computer networks by strengthening trust assurances between multiple computing nodes that may be controlled by different entities using protocols as described throughout this disclosure.

Figure 1:
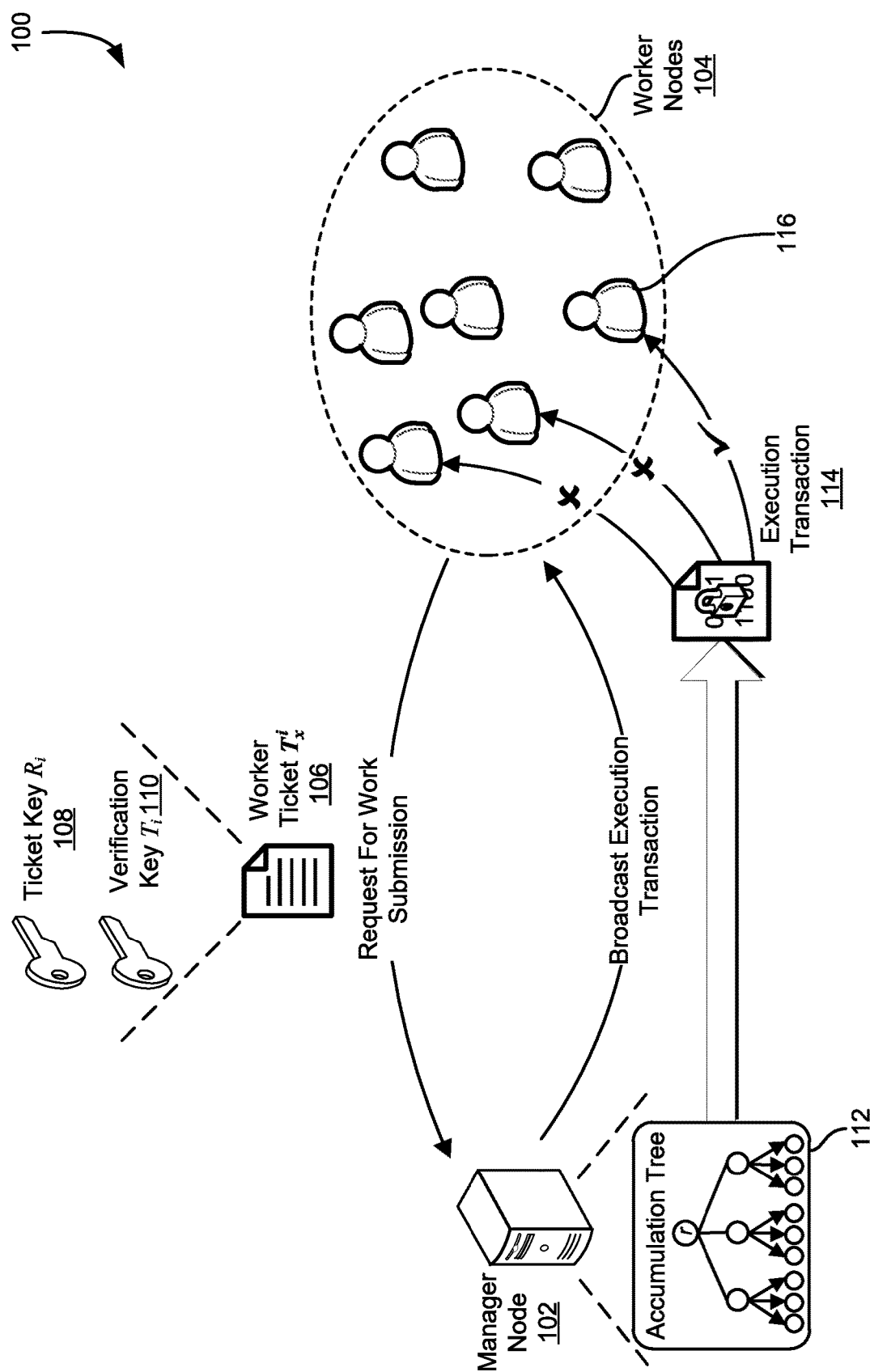
FIG. 1 illustrates a blockchain environment in which various embodiments can be implemented.

References may be made to FIG. 1, which illustrates an example computing environment 100 in which various embodiments of the present disclosure may be practiced. Systems and methods described herein may relate to a protocol for ensuring the unbiased distribution of computational tasks from a manager node 102 among a plurality of worker nodes 104. For example, the manager node may delegate execution of a computer program to a particular worker node of the plurality of worker nodes in an unbiased manner. For illustration purposes, FIG. 1 depicts a set of worker nodes 104, wherein a particular worker node 116 has been selected to execute a computer program. Use of the protocol may provide computationally verifiable assurances that the manager node is unable to determine, a priori, whether a particular worker node $P_i$ was selected to perform the computational task. In this way, the selection process is an unbiased (or 'fair') selection process in which the manager node is unable to determine whether a particular worker node $P_i$ chose the same combination of elements until the execution transaction 114 has been broadcasted (e.g., to a blockchain network). The combination of elements may be represented as leaf nodes of an accumulation tree, such as in the manner described below in connection with FIG. 2. In some embodiments, the execution transaction 114, once broadcasted and confirmed to a blockchain, is irrevocable, thereby ensuring that the manager node cannot make post hoc attempts to alter the selection process.

A manager node 102 may refer to one or more computing devices such as a computer server that stores executable code that, if executed by one or more processors of the one or more computing devices, causes the computing devices to manage registration and membership of nodes in a group membership, manage the unbiased selection of a worker node from a plurality, and more. In some embodiments, the manager node 102 can be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 1000 of FIG. 10). In some embodiments, the manager node 102 has inputs to receive data messages or objects representative of proposed transactions, such as a request for work tickets, which may be considered an example of a transaction as described herein. The manager, in some embodiments, is queryable for information, such as for information of a state of a transaction, the state of a membership group, parameters that may be utilised to construct a request for work ticket, and more.

Nodes may be communicatively coupled to one or more other of the nodes. Such communicative coupling can include one or more of wired or wireless communication. In the embodiment, the nodes each maintain at least a portion of a "ledger" of all transactions in the blockchain. In this manner, the ledger would be a distributed ledger. A transaction processed by a node that affects the ledger is verifiable by one or more of the other nodes such that the integrity of the ledger is maintained.

As for which nodes can communicate with which other nodes, it can be sufficient that each of the nodes in a blockchain network are able to communicate with one or more other of the nodes that a message that is passed between nodes can propagate throughout the blockchain network (or some significant portion of it), assuming that the message is one that the blockchain protocol indicates should be forwarded. One such message might be the publication of a new block proposed for inclusion onto a blockchain. Generally speaking, all nodes described in this disclosure may be adapted to implement some or all of the features as described above.

The computing environment 100 may further illustrate a set of worker nodes 104, wherein the worker nodes refer to computer systems that may provide a request for work ticket submission to the manager node 102. For example, a computer system $P_i$ may make a request to join the group membership (thereby having an opportunity to execute computational tasks distributed by the manager node) by submitting a worker ticket that includes quantities calculated using parameters provided by the manager node 102 to the requestor. The parameters may, in an embodiment, be specific to the particular group (e.g., the manager node 102 may operate multiple group memberships for execution of multiple computational tasks) and may be utilised to generate an accumulation tree having parameters specific to the particular group. In an embodiment, registration of a computer system $P_i$ to the membership results in the computer system $P_i$ being considered a worker node $P_i$ that is able to receive and execute computational tasks that are distributed by the manager node 102 according to a protocol.

In an embodiment, a worker node generates a worker ticket 106. A worker ticket $T_x^i$ for a worker node $P_i$ may include specific quantities generated by the worker node $P_i$ that are usable by the manager node 102 in a selection routine that performs an unbiased selection of a worker node from among the set of worker nodes 104. The worker ticket 106, in an embodiment, includes a ticket public key $R_i$ and a verification public key $T_i$, wherein the ticket key is generated based at least in part on an accumulation tree having a set of parameters that are provided to the worker node $P_i$ by the manager node 102, the set of parameters comprising trapdoor information s and parameters of the accumulation tree. In an embodiment, quantities generated based at least in part on the ticket public key $R_i$ 108 and the verification public key $T_i$ 110 are utilised in connection with the unbiased selection of a worker node to execute a computational task. An accumulation tree may be utilised in connection with the generation of the ticket public key $R_i$ and the verification public key $T_i$. Unregistered players, unaware of trapdoor information s distributed to registered worker nodes, cannot reconstruct quantities derived from the accumulation tree.

In various embodiments, bilinear-map accumulation trees are utilised for efficient data storage and membership authentication. In accordance with a protocol, quantities extracted from an accumulation tree, such as local and global digests, which compress the information contained in the tree, can be used to represent choices or combinations of elements made by participants of a membership. In this protocol, the worker nodes include their selected combinations in their request for work tickets (also referred to as worker tickets) as part of the ticket public key and the manager node is responsible for performing, according to the protocol, an unbiased selection of a worker node based at least in part on selecting a winning combination of elements and builds an execution transaction 114 that includes a computational task such as a computer program. As part of the protocol, the manager node 102 may utilise the accumulation tree 112 to select a particular worker node to perform the computational task. In an embodiment, manager node 504 cannot foresee, based on the plurality of public keys $R_1, \ldots, R_l$ collected from the blockchain, whether a particular worker node $P_i$ chose the same combination of elements until an execution transaction 114 is confirmed on the blockchain and that worker node tries to perform the work task (e.g., execution of a program).

In an embodiment, successful execution of the computer program may result in the transfer of digital assets. The execution transaction 114 may be encumbered in such a way that, as part of a successful execution of the computational task, the worker node provides a cryptographically verifiable attestation that the worker node is in possession of the selected combination after the execution transaction is confirmed on the blockchain. As an example, FIG. 1 illustrates that the selected worker node 116 is able to execute the computational task (as indicated by the check mark) whereas other worker nodes are unable to successfully execute the task (as indicated by the 'x' marks).

Various embodiments are contemplated in the scope of this disclosure—for example, a safety net mechanism may be implemented so that if no worker node is selected to execution the program, each worker node can redeem its initial transfer of digital assets after a lapse of time following the confirmation of the execution transaction on the blockchain. In an embodiment, this safety net mechanism can also be utilized where the selected worker node fails to or refuses to execute the program, executes the program incorrectly, and other such variations in which the selected worker node does not correctly execute program. Moreover, the manager node cannot learn if a particular worker node was selected until the computational task has been executed (e.g., successful execution of a computer program that is at least partially encoded in the execution program may be broadcasted and confirmed to a blockchain ledger).

Figure 2:
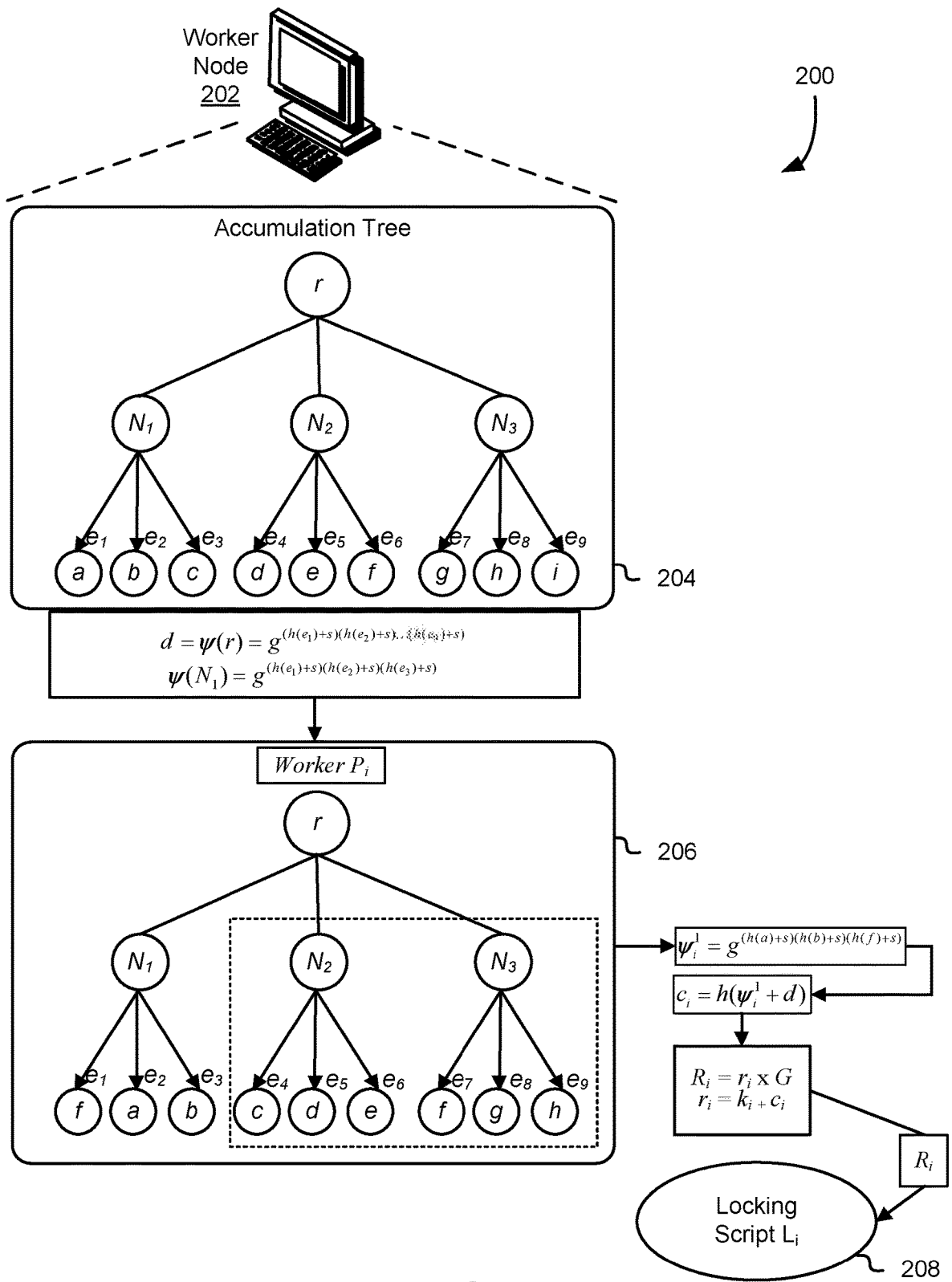
FIG. 2 illustrates a computing environment in which a worker node constructs a public key, in accordance with at least one embodiment.

FIG. 2 illustrates an accumulation tree that is used by a worker node worker node $P_i$ to generate a locking script 208 that is used in a distributed system where a worker is selected from among a group of worker nodes to execute a program. The worker node 202 may be any suitable computer system and may be implemented in accordance with those described elsewhere in this disclosure, such as those discussed in connection with FIG. 1.

Generally speaking, cryptographic accumulators can be used to provide storage of data in a hash table and perform membership authentication. In some cases, cryptographic accumulators are RSA-based or bilinear-map accumulators, and can be static (fixed sets of members) or dynamic (allowing the addition or deletion of members within the set). A framework behind static bilinear-map accumulators may be described in greater detail below. For example, let $G_1$, $G_2$ be two cyclic multiplicative groups of p with generators $g_1$, $g_2$. There may also be an isomorphism $$\Phi: G_2 \to G_1$$

such that $\phi(g_2)=g_1$. Given $G_M$, a cyclic multiplicative group of order p, a bilinear pairing can be defined $$e: G_1 \times G_2 \to G_M$$

with the following properties:
- Bilinearity: $e(P^a, Q^b) = e(P, Q)^{ab} \forall P \in G_1, Q \in G_2$ and $a, b \in \mathbb{Z}_p$
- Non-degeneracy: $(g_1, g_2) \neq 1$
- Computability: $\exists$ an efficient algorithm to compute $e(P, Q) \forall P \in G_1, Q \in G_2$ In the following we will set $G_1=G_2=G$ and $g_1=g_2=g$ and we will consider the pairing $$e: G \times G \to G_M.$$

The bilinear-map accumulator based on the bilinear pairings can accumulate a set of n elements $E=(e_1, \ldots, e_n) \in G$ in the accumulation value $f'(E)=g^{(e_1'+s)(e_2'+s) \ldots (e_n'+s)}$. Note that the accumulation value is an element in G and it accumulates elements in $\mathbb{Z}_p^*$. Indeed, the elements $(e_1', e_2', \ldots, e_n') \in G$ are a cryptographic hash of the original element of the set E $(e_1, \ldots, e_n) \in G$, i.e. $e_i'=h(e_i)$ with $$h: G \to \mathbb{Z}_p^*, h: G \to \mathbb{Z}_p^*$$

is a collision-resistant hash function taking as inputs elements of the multiplicative cyclic group G and producing as outputs integers in $\mathbb{Z}_p^*$. Finally, s represents the trapdoor information that is kept secret.

In an embodiment, an accumulation tree 204 is a hierarchical structure used to efficiently store data using authenticated data structures. The accumulation tree 204 may be used to reduce communication and verification costs and/or storage costs. An accumulation tree 204 may be used to verify the correctness of hash values for subsets involved in the query: the public tree digest for the set guarantees the hash values and in turn, the hash values validate the set. The accumulation tree 204 may be denoted as $T(\varepsilon)$ with $0<\varepsilon<1$ wherein $T(\varepsilon)$ represents a rooted tree with n leaves where the n elements of the set E are stored. The number of levels in the tree may be defined as $$l = \left\lceil \frac{1}{\varepsilon} \right\rceil$$

while the number of children nodes per node is $O(n^\varepsilon)$. In an embodiment, all the leaves (or set elements) are at the same level identified with level 0.

For every leaf node v in the tree $T(\varepsilon)$ that stores an element $e \in [e_1, \ldots, e_9]$, we define the accumulation value $\psi(v)$ as equal to the value of the element itself:

$$\psi(v)=e$$

For every non-leaf node v in the tree $T(\varepsilon)$ that lies in the levels $1 \leq i \leq l$ (here l=2) the accumulation may be defined as follow:

$$\psi(v)=g^{\Pi_{u \in C(v)}(h(\psi(u))+s)}$$

where $C(v)$ is the set of children of node v, and $\psi(u)$ is the bilinear local digest of node u. For instance, for the accumulation tree illustrated in FIG. 2 we would have $C(v=N_1)=\{a, b, c\}$. s is the trapdoor of the scheme and $$h: G \to \mathbb{Z}_p^*$$

is a collision-resistant hash function.

For a given element x belonging to the set E the proof of membership $\pi(x)$ comprises an ordered sequence of proofs, one per layer of the accumulation tree $\pi(x)=\{\pi_i, i=1, \ldots, l\}$. Each element of the proof corresponds to the pair composed by a local digest $\alpha_i$ and a branch witness $\beta_i$ of the element per level:

$$\pi_i=(\alpha_i, \beta_i), i=1, \ldots, l$$

Thus, for a given layer i with $1 \leq i \leq l$ we have, for a given layer i, the corresponding proof element comprises two components:

$\alpha_i$ that represents the bilinear digest of the node in the previous layer (layer i−1) found in the path of nodes $$P(x): x \to r$$

linking the element x to the root r. For a layer $1 < i < 1$, $\alpha_i$ is the same for all the elements present in the layer i−1.

$\beta_i$ that represents the "branch witness", a witness that authenticates the missing node of the path from the queried node to the root of the tree.

In some embodiments, the proof is generally computed by a trusted party and sent to a user/prover. The trapdoor information s is unknown to the prover. However, the quantities $g^s, g^{s^2} \ldots g^{s^n}$ are made public (e.g., by the third party).

The global bilinear digest of the whole accumulation tree is:

$$d = \psi(r)$$

where $$\psi(r) = g^{(h(\psi(d))+s)(h(\psi(e))+s)(h(\psi(f))+s)}$$

and r indicates the root of the tree. A hierarchy is therefore in place, where participants (e.g., worker nodes) assume different roles based at least in part on their respective positions in the hierarchy, which may reflect the combinations of elements chosen by the worker nodes.

In the verification phase, the user provides its proof $\pi(x)$ to a verifier. If $g^s$ has been made public the verifier
1. checks that $\alpha_1 = x$;
2. for $i = 2, \ldots, l$ verifies that $e(\alpha_i, g) = e(\beta_{i-1}, g^{s+h(\alpha_{i-1})})$.

Using the bilinear mapping property, the second relation is equivalent to verifying the following equality:

$$\alpha_i = \beta_{i-1}^{s+h(\alpha_{i-1})}, \forall i = 2, \ldots, l.$$

In this scenario, the proof is accepted only if all the relations above hold.

In an embodiment, public/private key pairs are generated using the local and global digests of accumulation trees built using data provided by the worker nodes. These keys can be used to represent element combinations chosen by worker nodes in the protocol presented in this disclosure. A key pair may refer to a public key and a private key that, together, are usable to perform related operations, such as encryption/decryption. In some cases, the private key is used to generate an attestation of possession of the private key, wherein the attestation can be computationally verified using the corresponding public key.

In an embodiment, the worker node 202 chooses a combination of c elements among the N elements given in S. In an embodiment, the worker node $P_i$ builds a local digest of the node $N_1$ representing the parent of the c elements of the worker's choice. In an embodiment, we denote $\psi_i^1$ the local digest corresponding to the worker node $P_i$. In an embodiment, the worker node computes the global digest of the accumulation tree 204, denoted d, using the entire set of N elements. In an embodiment, the local and global digests are represented by points on an Elliptic Curve, whose sum can be computed by worker node $P_i$ to obtain a new point $\Psi_i$ on the Elliptic Curve: $\Psi_i = \psi_i^1 + d$. In an embodiment, the worker node $P_i$ computes a new number $c_i$ using a collision-resistant hash function $$h: \mathbb{G} \to \mathbb{Z}_p^*,$$

that is, the hash of the point $\Psi_i$: $c_i = h(\Psi_i)$. This quantity $c_i$, in an embodiment, is considered a private key with an associated public key $V_i$ given by $V_i = c_i \times G$ where G is the generator point of the Elliptic Curve (g=G). Given the homomorphic property of the Elliptic Curve, the worker node $P_i$ computes a new public key $R_i$ given by:

$$R_i = Q_i + V_i = r_i \times G$$

where $r_i = k_i + c_i$ is the private key associated to the public key $R_i$.

In an embodiment, FIG. 2 illustrates a computing environment 200 for constructing public keys for a worker node 202. As an illustrative example, a set of 9 elements is shown in FIG. 2, although larger and smaller trees can be utilised based on various factors, such as the number of worker nodes, number of elements of the set being selected, and combinations thereof. In an embodiment, a first worker node $P_i$ chooses a first combination of elements (e.g., (a, b, $f$), as illustrated in FIG. 2) while a second worker node $P_j$ chooses the combination (e.g., (a, i, g)), resulting in the generation of local digests $\psi_i^1$ and $\psi_j^1$ having different values. It should be noted that the same global digest d is used by the worker nodes to generate the local digests $\psi_i^1$ and $\psi_j^1$.

In an embodiment, the local digest of $N_1$ is independent of the order of the c=3 children elements and the distribution of the remaining 6 elements (i.e., elements not selected for the worker's combination, represented in the dotted box of FIG. 2) in our example is irrelevant in the computation of the global digest. In an embodiment, all the elements $e_1, \ldots, e_N$ are present in the accumulation tree 206 generated by the worker node $P_i$ at least once (e.g., exactly once) to correctly compute the global digest, although the order of the remaining elements may be irrelevant.

In an embodiment, a worker node $P_i$, generates the redeem script 208 that encumbers the transfer of digital assets for its ticket using the public key $R_i$, the latter including (although concealed) its selected combination and the ephemeral public key $T_i$. In an embodiment, the worker node constructs a multisignature script as part of joining a membership group. For example, the worker node $P_i$ may build a 1-of-3 multisignature script as follows:

OP_1 $R_i$ $T_i$ D OP_3 OP_CHECKMULTISIG

Where $R_i$ is the public key comprising the combination of elements chosen by the worker node $P_i$, $T_i$ is the second ephemeral public key generated by $P_i$, and D is the public key provided by the manager node. This multisignature script allows the worker node $P_i$ to use the space devoted to two public keys to store their selected combination of elements and the verification public key while the third space is used for the manager node to unlock the script (by providing the private key associated to the public key D). Accordingly, in an embodiment, the worker node $P_i$ builds the following script 208:

```
F_i OP_CHECKSIG
OP_IF
    OP_1
OP_ELSE
    ΔT_S OP_CHECKSEQUENCEVERIFY OP_DROP
    x OP_1 R_i T_i D OP_3 OP_CHECKMULTISIG
OP_ENDIF
```

In an embodiment, the script 208 can be executed by or on behalf of the worker node $P_i$ to transfer control of digital assets sent to the associated address at any point in time (signing with the private key associated to the public key $F_i$) or it allows the manager node to redeem to fund after a certain time $\Delta T_S$ has elapsed (signing with the private key associated to D). It should be noted that the quantity x described above may be an extra value removed from the stack during the check due to a bug in the Bitcoin Core release. While described here, the quantity may be omitted for clarity elsewhere in this disclosure.

Figure 3:
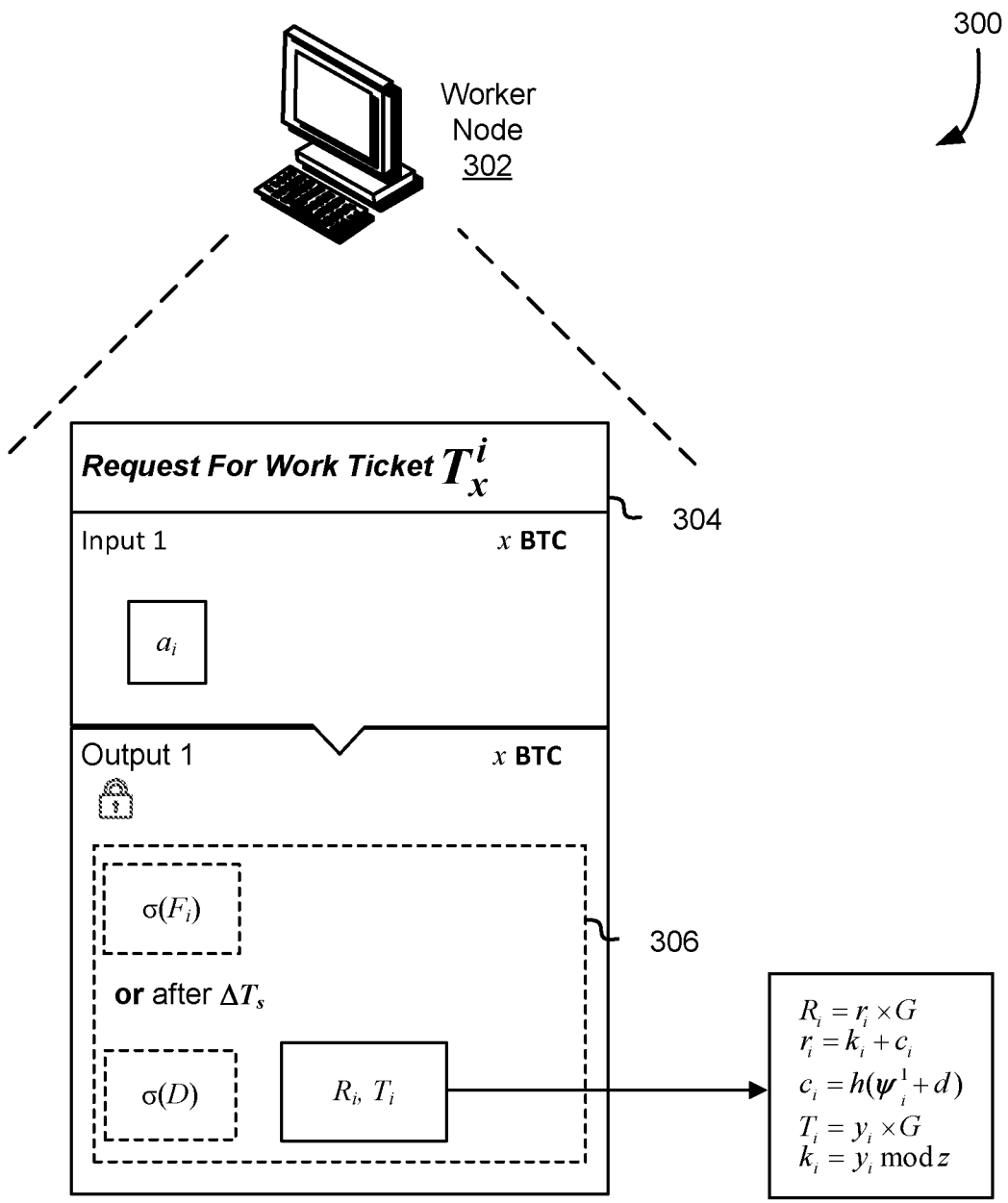
FIG. 3 illustrates a computing environment in which a worker node and a corresponding worker ticket that the worker may use to confirm registration to a membership group, in accordance with at least one embodiment.

FIG. 3 illustrates a computing environment 300 in which a worker node 302 and a corresponding worker ticket 304 that the worker may use to confirm registration to a membership group. In an embodiment, a manager node delegates execution of computer programs among worker nodes of the membership group.

In an embodiment, each worker node that joins the membership group generates and broadcasts a worker ticket that can be used to authenticate the node's inclusion into the membership group. Each worker ticket may include information generated by the worker nodes that is usable, by the manager node, to select a worker node for execution of work (e.g., computer programs), wherein the information does not reveal the identity of the particular worker node associated with the information. The worker ticket 304, in an embodiment, is used by a worker node 302 to establish membership in a group and includes quantities (e.g., $R_i$ and $T_i$) that are used in an unbiased selection and verification process for distributing work (e.g., execution of a computer program) to a worker node among a plurality of worker nodes in the membership group.

Each worker node, such as the worker node $P_i$ illustrated in FIG. 3, generates a worker ticket $T_x^i$ that includes at least one input and one output. The one or more inputs, in an embodiment, include at which is an unspent transaction output (UTXO) owned by the worker node, while the output comprises the bilinear digest of the node in the previous layer (layer i–1) found in the path of nodes $$P(x): x \to r$$

linking the element x to the root r.

In an embodiment, the worker node $P_i$ uses a locking script 306 such as the locking script described in connection with FIG. 2 to generate a worker ticket $T_x^i$ in which the worker node 302 transfers digital assets to the address derived from the script. The transaction may be broadcast to a blockchain network and used by the manager node to authenticate that the worker node is a member of the membership group to which work is to be distributed (e.g., execution of a program).

In an embodiment, each worker node $P_i$ creates two ephemeral public/private key pairs:

$$Q_i = k_i \times G$$

$$T_i = y_i \times G$$

Where G is the generator of the Elliptic Curve (g=G). The two private keys, $k_i$ and $y_i$, verify the following relation:

$$k_i = y_i \bmod z$$

Where z is a large number chosen by the manager node and made publicly available. Although z should be large, it should verify $z \le p$ with p the prime number defining the order of the group over which the Elliptic Curve is defined. In an embodiment, the key pairs are one-time use keys, as the private keys may be revealed (e.g., broadcast to the blockchain network) by the worker node that is selected to execute a program. The second ephemeral public/private key pair $\{T_i, y_i\}$ may be called a verification key pair and, in some embodiments, is used to provide computationally verifiable assurances that a particular worker node claiming to have been selected to perform a work item was actually selected. In some embodiments, implementation of the verification key pair is optional, such as where such a trust relationship is not necessary or established using other techniques.

In an embodiment, the worker node $P_i$ broadcasts the transaction $T_x^i$ and the transaction is confirmed to the blockchain. In an embodiment, multiple worker nodes $P_1, \ldots, P_I$ generate corresponding worker tickets that are confirmed to a blockchain network. A manager node may monitor the contents of the blockchain ledger and collect public keys $R_i$ and $T_i$ for the multiple worker nodes and, upon detecting that a maximum threshold number of worker nodes have registered for group membership, proceed to the next step of the process involving selection of a worker node to execute a program.

Figure 4:
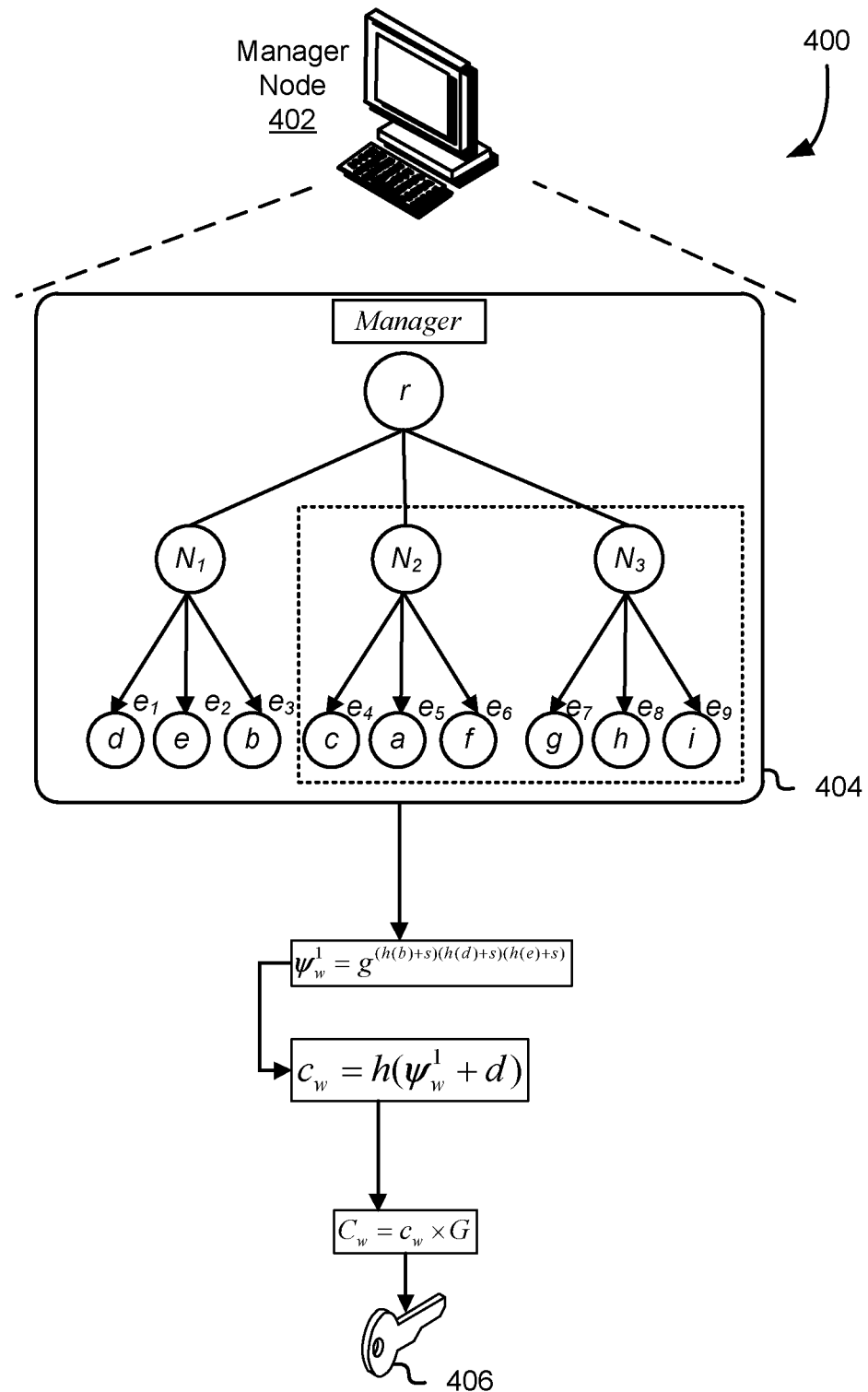
FIG. 4 illustrates a computing environment that may be utilised in connection with selecting a worker node to perform a computational task (e.g., execute a program), in accordance with at least one embodiment.

FIG. 4 illustrates a computing environment 400 that may be utilised in connection with selecting a worker node to execute a program. The manager node 402 may be any suitable computer system and may be implemented in accordance with those described elsewhere in this disclosure, such as those discussed in connection with FIG. 1. In an embodiment, the manager node 402 builds an accumulation tree 404 using randomly selected elements to generate a public key 406 based at least in part on quantities derived from the randomly selected leaf nodes of the accumulation tree 404.

The manager node 402 may choose a random combination of c elements, build the accumulation tree 404 shown in FIG. 4 using the parameters previously chosen and distributed to the worker nodes, and compute the local digest of the first node as well as the global digest. As illustrated in FIG. 4, in an embodiment, the manager node obtains a new public key 406 computed as $C_W = c_W \times G$ where $c_W$ is the hash of the sum of the two points on the Elliptic Curve representing the local digest for the combination of elements selected by the manager node and the global digest of the accumulation tree. For example, in FIG. 4, the random combination selected by the manager node may be (b, d, e), used to compute the new public key $C_W$. In an embodiment, the ordering of the elements not selected as part of the random combination (represented in the dotted box of FIG. 4) is irrelevant, although it is necessary for each of the elements to be included in the accumulation tree 404.

Figure 5:
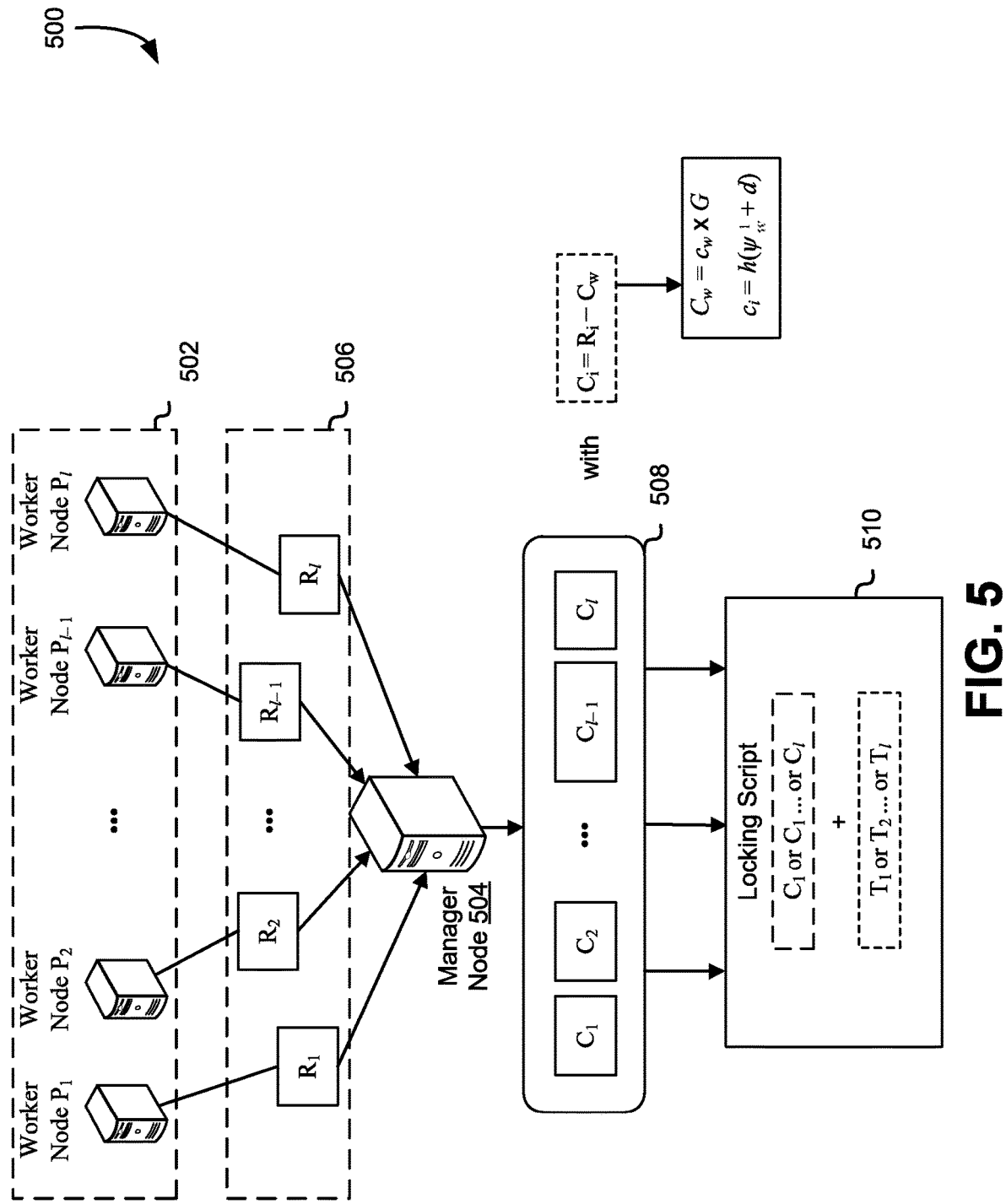
FIG. 5 illustrates a computing environment in which public keys are constructed from the worker tickets submitted by worker nodes, in accordance with at least one embodiment.

FIG. 5 illustrates a computing environment 500 in which public keys are constructed from the worker tickets submitted by worker nodes participating in a membership group. The computing environment 500 may be in accordance with those described elsewhere in this disclosure, such as those discussed in connection with FIGS. 1-4.

In an embodiment, worker nodes $P_1, \ldots, P_I$ 502 broadcast worker tickets that include respective public keys $R_1, \ldots, R_I$ 506 to a blockchain network, which are detected and collected by the manager node 504 that is charged with selecting a worker node from among the plurality of worker nodes to perform a task (e.g., execute a computer program). For each public key $R_i$ provided by a worker node $P_i$, the manager node 504 computes a new point $C_i$ on the Elliptic Curve, by subtracting the point associated with the randomly selected combination $C_W$ described in connection with FIG. 4 from each respective public key $R_i$:

$$C_i = R_i - C_W = (k_i + c_i - c_W) \times G$$

Accordingly, the manager node 504 may compute a plurality 508 of Elliptic Curve points $C_1, \ldots, C_l$ from the public keys $R_1, \ldots, R_l$. Thus, it follows that $C_i = Q_i$ if and only if $c_i = c_W$, e.g. the public/private key pair resulting from the subtraction corresponds to the first ephemeral key pair generated by the worker node (and kept private) if the worker node's worker ticket (represented by $c_i$) matches the quantity $c_W$ derived from the manager node's randomly selected combination: $c_i = c_W$.

It should be noted that in an embodiment, the manager node 504 cannot anticipate if this equality is verified for a given worker node. Thus, the manager node 504 can only draw an unbiased combination of c elements in various embodiments where the manager node 504 lacks additional knowledge that can be used to deduce the quantities chosen by various worker nodes. In an embodiment, manager node 504 cannot check the validity of these newly generated public keys, i.e., the manager node 504 cannot foresee, based on the plurality of public keys $R_1, \ldots, R_l$ 506 collected from the blockchain, whether a particular worker node $P_i$ chose the same combination of elements until an execution transaction is confirmed on the blockchain and that worker node tries to perform the work task (e.g., execution of a program). In an embodiment, the locking script 510 is encoded in the execution transaction and is in accordance with those discussed in connection with FIG. 6. In an embodiment, the manager node 504 creates a locking script 510 that encumbers the execution of a computer program using the l new public keys $C_i$, $i \in [1,l]$ and the l verification public keys $T_i$, $i \in [1,l]$ so that only a worker node that selected and broadcast the same random combination as the combination selected by the manager node is able to unlock the script. In an embodiment, techniques surrounding the use of the verification public keys are optional and can be omitted from some implementations contemplated in the scope of this disclosure.

Figure 6:
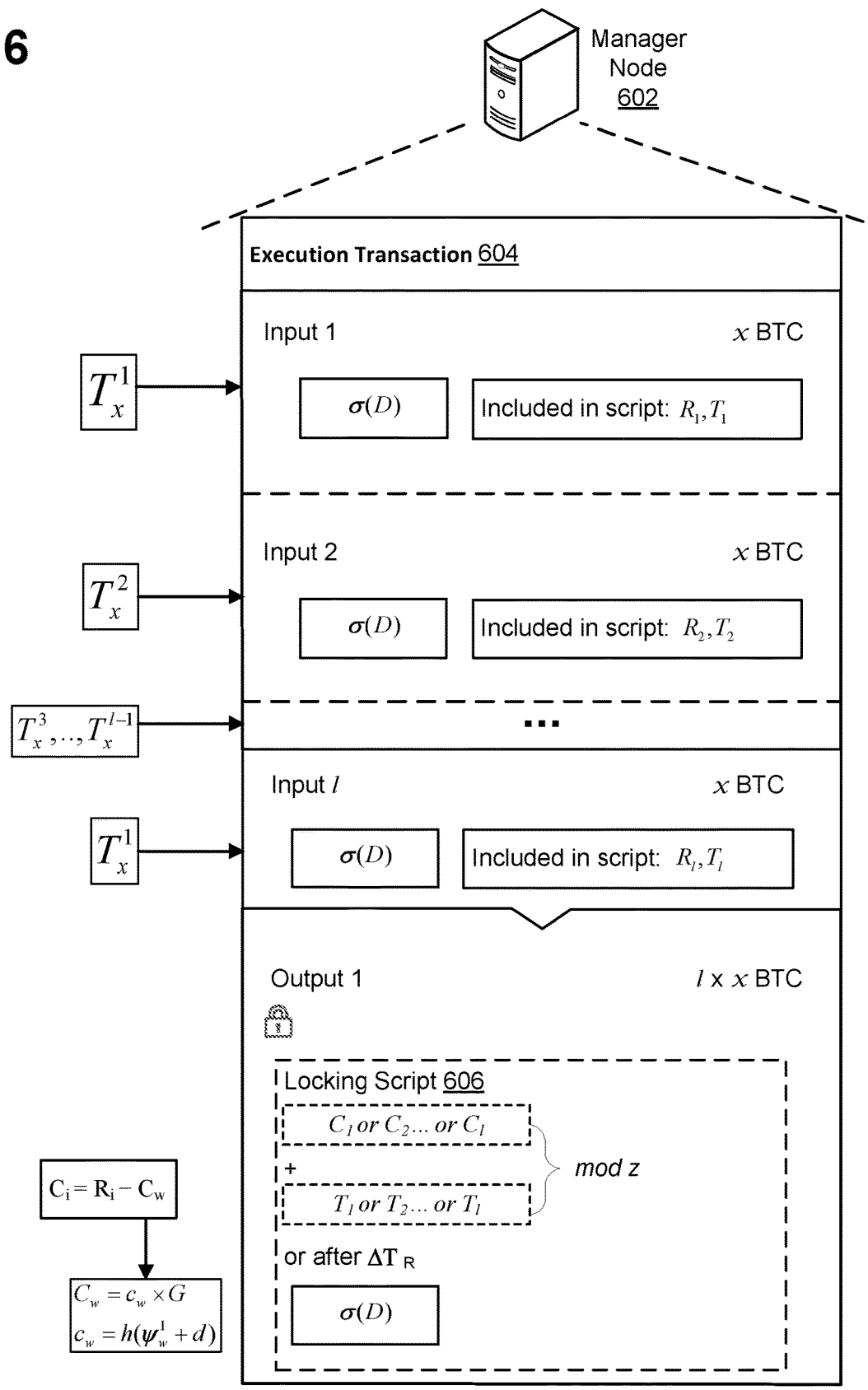
FIG. 6 illustrates a computing environment in which a manager node generates an execution transaction, in accordance with at least one embodiment.

FIG. 6 illustrates a computing environment 600 in which a manager node 602 generates an execution transaction 604 that includes at least part of a computer program that can be executed by worker node selected from a plurality of worker nodes in a membership group. The execution transaction 604 may include one or more inputs from worker nodes in the membership group (e.g., one input per worker node), and an output that includes a locking script that encumbers the execution of a computer program such that only a selected worker node is able to successfully execute the program.

The manager node 602 illustrated in the computing environment 600 may be a manager node in accordance with those described in connection with FIGS. 1, 4, and 5, and be implemented in any suitable manner. The manager node 602 may include one or more computer-readable mediums (e.g., non-transitory computer readable mediums) that include instructions that can be executed by one or more processors of a computer system to cause the system to perform various techniques described herein. The manager node 602 may be a node of a blockchain network.

In an embodiment, the manager node 602 creates the locking script 606 for the computer program using the l new public keys $C_i$, $i \in [1,l]$ and the l verification public keys $T_i$, $i \in [1,l]$. Note that in some embodiments, the manager node does not need to respect the order in which the public keys are given and as a consequence, the public keys $C_i$ and $T_i$ provided by a worker node $P_i$ do not need to be in the same position in the two sets of public keys used by the manager node 602, respectively $\{C_1, C_2, \ldots, C_l\}$ and $\{T_1, T_2, \ldots, T_l\}$.

In an embodiment, the manager node broadcasts a protocol rollback transaction in such a way that the worker nodes can redeem one UTXO in the transaction by signing with the private key associated to $T_i$ after $\Delta T_E$. This option may be utilised as an assurance to worker nodes against cases in which the manager node 602 fails to broadcast the execution transaction according to the protocol. In an embodiment, the protocol requires that the execution transaction 604 be published within a set period of time, includes a particular number of inputs or outputs, particular quantities as inputs and/or outputs, and more. In an embodiment, the protocol rollback transaction also offers the worker nodes a rollback option in case no worker node executes the program, either because no worker node selected the same combination as the manager node, the worker node refused to execute the program, the worker node did not execute the program within a time prescribed by the protocol, etc. In an embodiment, if no worker node executes the program, after $\Delta T_E$ the worker nodes perform a rollback by claiming the UTXOs and the protocol ends.

On the other hand, if no worker node executes the program and the worker nodes claim the UTXO in the protocol rollback transaction, the manager node should then be able to unlock the digital assets encumbered in the execution transaction. Therefore, in the script locking the digital assets encumbered by the UTXO in the execution transaction 604, the manager node should add the option to transfer control of the digital assets encumbered in the UTXO if no worker node has done so after a certain time $\Delta T_R \leq \Delta T_E$ has elapsed.

In an embodiment, the manager node 602 constructs the following locking script 606, in which the opcodes may be in accordance with those used in a Bitcoin-based network. Additionally, the opcode OP_ECMUL refers to an opcode capable of performing point multiplication on the Elliptic Curve (comments and annotations are included with a preceding '#' symbol and are not required):

```
OP_IF
    ΔT_R OP_CHECKSEQUENCEVERIFY OP_DROP
    D OP_CHECKSIG
OP_ELSE
    OP_SWAP OP_DUP OP_TOALTSTACK
    OP_SWAP OP_DUP OP_TOALTSTACK
    OP_TOALTSTACK # Move b to ALT STACK for key check. Move a and b to ALT STACK for later modulus check
    # Check fist public key (worker node's chosen combination of elements)
    G OP_ECMUL # Elliptic Curve point multiplication
    C_1 OP_EQUAL # Check if α × G = C_1
    OP_IF
        OP_DROP
        OP_DROP
    OP_ELSE
        C_2 OP_EQUAL # Check if α × G = C_2
        OP_IF
            OP_DROP
        OP_ELSE
            C_3 OP_EQUALVERIFY # Check if α × G = C_3
        OP_ENDIF
    OP_ENDIF
    # Check second public key
    OP_FROMALTSTACK
    G OP_ECMUL
    # For each 'OP_ELSE': duplicate the private key b, drop later
    OP_DUP OP_DUP
    T_1 OP_EQUAL # Check if b × G = T_1
    OP_IF
```

-continued

```
        OP_DROP
        OP_DROP
    OP_ELSE
        T_2 OP_EQUAL # Check if b × G = T_2
        OP_IF
            OP_DROP
        OP_ELSE
            T_3 OP_EQUALVERIFY # Check if b × G = T_3
        OP_ENDIF
    OP_ENDIF
    #Check Modulus
    OP_FROMALTSTACK z
    OP_MOD OP_FROMALTSTACK OP_EQUAL # Check a = b
    mod z
OP_ENDIF
```

For simplicity, the locking script example shown above considers l=3 worker nodes, but can be adapted to support additional worker nodes. The first two lines in the example locking script checks the value of the last input in the redeem script:

1→locking_script_rollback: the script expects two more inputs that is the signature and public key of the manager node (D). The script can be unlocked after the time $\Delta T_R$ has elapsed.

Otherwise→locking_script_execution: two more inputs are provided; a worker node $P_i$ is expected to try and unlock the script using the two private keys $k_i$ and $y_i$ associated with the public keys $C_i$ and $T_i$ included in the script.

The script is then split into an IF and an ELSE statement to encode the two options to transfer digital assets.

The block of opcodes in the IF statement may be referred to as a locking_script_rollback subroutine and comprises the option of rollback (of digital assets transferred in the protocol rollback transaction) for the manager node in case no worker node executed the computational task. In an embodiment, the script is constructed in a way that if, after a certain amount of time $\Delta T_R$ has elapsed, no worker node has executed the program (e.g., because none of the combinations picked by the worker nodes match the winning combination) the digital assets can be redeemed by the manager node, signing with the private key associated to the public key D used in the script.

The second block of opcodes in the ELSE statement of the locking script may be referred to as a locking_script_execution subroutine and comprises the option for a worker node to execute the computational task (e.g., computer program). Assume a worker node $P_i$ tries to unlock the script with two inputs a and b. This part of the script comprises three sub-parts:

Check if $a \times G = C_j, \forall j \in [1,l]$, i.e. the worker node was selected and one public key in the set $\{C_1, C_2, \ldots, C_l\}$ corresponds to $Q_i$ (i.e. $a = k_i$);

Check if $b \times G = T_j, \forall j \in [1,l]$, i.e. one public key corresponds to $T_i$ (i.e. $b = y_i$); and Check is a=b mod z, the two private keys provided by the selected worker node verify the modulus relationship, ensuring that the worker node provides the two original private keys created for the round: $k_i = y_i$ mod z.

In an embodiment, the last check (i.e., the modulus check) ensures that a worker node $P_i$ does not cheat and try to wrongfully claim the worker node was selected by computing the private key associated to $C_i = Q_i + V_i - C_W$ in the script, when $V_i \neq C_W$. Note that in some embodiments, the modulus check is only valid at the level of the private keys and the equality is not true for the associated public keys. The manager node cannot learn anything about the worker node's selected combinations from the worker ticket when building the locking script for the program execution.

The locking script example is merely one among many variations contemplated within the scope of this disclosure. For example, in an embodiment, the locking script does not include instructions to check the second public key and/or instructions to check the modulus a=b mod z holds. These checks may be unnecessary in embodiments where there are other assurances in place (e.g., other trust protocols) that ensure that worker nodes are honest and will not attempt to make a fraudulent claim of having been selected to execute the program when the worker node did not, in fact, select the winning combination. In an embodiment, the structure of the opcode block in the ELSE statement depends on the number of keys considered in the script. In the form illustrated in FIG. 6, the script in the ELSE statement (first sub-part only, i.e. verifying the first private key) can expand as follows:

```
# OP_DUP l-1 times
OP_DUP OP_DUP ... OP_DUP
C_1 OP_EQUAL # Check if α × G = C_1
OP_IF
    # OP_DROP l -1 times
    OP_DROP
    ...
    OP_DROP
OP_ELSE
    C_2 OP_EQUAL # Check if α × G = C_2
    OP_IF
        # OP_DROP l-2 times
        OP_DROP
        ...
        OP_DROP
    OP_ELSE
        ...
            C_i OP_EQUAL # Check if α × G = C_i
            OP_IF
                # OP_DROP l-i times
                OP_DROP
                ...
                OP_DROP
            OP_ELSE
                ...
                    OP_ELSE
                    # Check if α × G = C_l
                    C_l OP_EQUALVERIFY
                    # OP_ENDIF l-times (for each OP_IF)
                    OP_ENDIF
            ...
        OP_ENDIF
OP_ENDIF
```

In an embodiment, the manager node builds the execution transaction using the transaction identifier of the worker tickets $T_x^i$, $i \in [1,l]$ confirmed on the blockchain, including as inputs the l UTXOs spent by the worker nodes and with a unique output amounting of l×x BTC locked under the aforementioned script. Assuming the execution transaction is confirmed on the blockchain before $\Delta T_E$, the worker nodes can each try to execute the program although only the worker node selecting the winning combination may be able to successfully execute the program, whose successful execution may involve the ability to transfer or otherwise digital assets encumbered by the execution transaction.

In an embodiment, at $t > \Delta T_R$, if no worker node has executed the program (possibly indicating that the combination selected by the manager node does not match the combinations selected by any of the worker nodes) then the manager node redeems the digital assets encumbered by the worker tickets as a substitution for the digital assets transferred by the manager node in the protocol rollback transaction. Soon after, at $t \geq \Delta T_E$, the worker nodes redeem x BTC each in the protocol rollback transaction, effectively rolling back the transfer of digital assets that each of the worker nodes provided in the worker tickets as part of the registration process.

In an embodiment, one worker node (e.g., worker node $P_i$) successfully executes the program, which may be usable to transfer the control of digital assets and reveals two private keys when unlocking the script ($k_i$ and $y_i$). The manager node then knows one of the l private keys, $y_i$, and as a result can unlock the script in the protocol rollback transaction, effectively transferring control of the digital assets of the l outputs.

In an embodiment, according to the protocol, l worker nodes submit worker tickets in the form of blockchain transactions wherein each transaction has an output, if executed as part of a computer program, transfers control of digital assets to the manager node, the worker tickets comprising information that encodes the combination of c elements chosen by a worker node among the set of N elements chosen for a given task (e.g., program execution). The script locking of the execution transaction is constructed in such a way that, at most, only one worker node can redeem it if providing the right information.

According to principles of probability, the chance of one worker node being selected is given by the inverse of the binomial factor:

$$P(c_i = c_W) = 1 / C_N^c$$

Where $$C_N^c = \frac{N!}{c!(N-c)!}$$

represents the number of possible combinations of c elements among the set of N elements.

For instance, given N=9, c=3 as in the illustration considered in connection with FIG. 2, there are 84 possible combinations and therefore the probability of a worker node being selected is ~1.2%.

In an embodiment, each worker node is given a complete set of elements and the freedom to choose any combination of c elements among the set of N elements—accordingly, the probability of two worker nodes $P_i$ and $P_j$ ($i \neq j$) selecting the same combination is given by:

$$P(c_i = c_j, i \neq j) = (1 / C_N^c)^2$$

For instance, given N=9, c=3 as in the illustration considered in various embodiments, the probability of two worker nodes selecting the same combination is ~0.01%.

Accordingly, the probability for two or more worker nodes to select the same combination is given by the formula:

$$P(c_i = \{c_j\}, i \neq j) = \sum_{k=2}^{N} (1 / C_N^c)^k$$

Where the leading term is the probability that two worker nodes choose the same combination.

In an embodiment, the parameters (N, c) and n (maximum number of worker nodes per round) are chosen such that $P(c_i = \{c_j\}, i \neq j)$ remains below a threshold probability so as to ensure that there is not more than a negligible probability of two or more worker nodes choosing the same combination.

Figure 7:
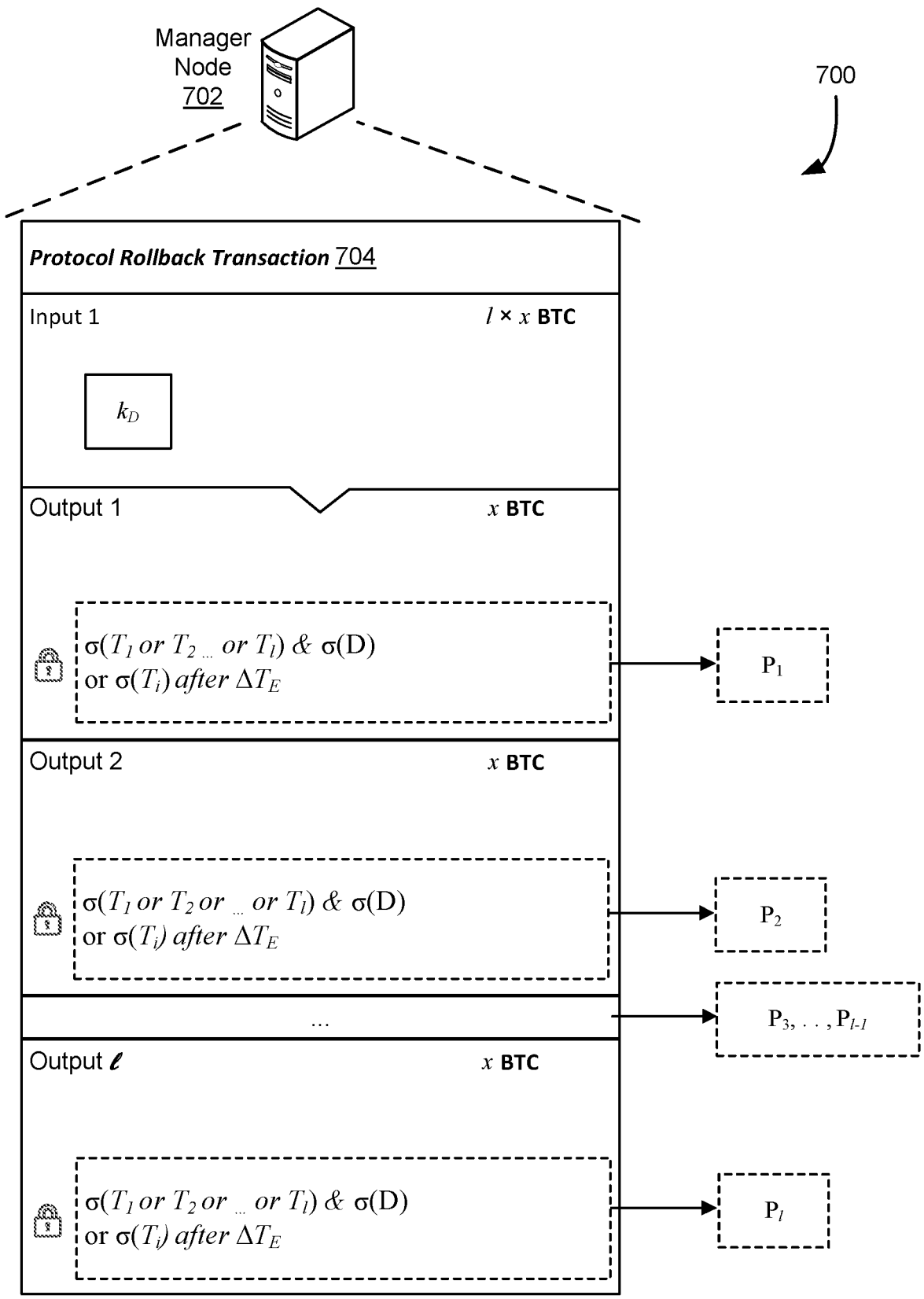
FIG. 7 illustrates a computing environment in which a manager node generates a protocol rollback transaction that is utilised to perform an unbiased selection of a worker node from a plurality of worker nodes to perform a task (e.g., execute a program), in accordance with at least one embodiment.

FIG. 7 illustrates a computing environment 700 in which a manager node 702 generates a protocol rollback transaction 704 that is utilised in accordance with a protocol to perform an unbiased selection of a worker node from a plurality of worker nodes to perform a task (e.g., execute a program). In an embodiment, the manager node 702, upon receiving/observing the confirmation of l work tickets on the blockchain at time $T_C$, collects the l public key pairs $\{R_i, T_i\}$ included in the redeem script of said work tickets. Since the manager node 702 does not know the public/private key pair ($Q_i$, $k_i$) chosen by a worker node $P_i$ when constructing $R_i = Q_i + V_i = (k_i + c_i) \times G$ the manager node 702 cannot deduce $c_i$ and therefore cannot learn the combination chosen the worker node.

Before the worker node selects a winning combination and build the execution transaction, the manager node may provide some assurance to the worker nodes that the manager node will follow the protocol. Indeed, after a certain point in time $\Delta T_S$, the manager node has the ability to transfer control of digital assets committed by the worker nodes in the worker tickets $T_x^i$, $i \in [1, l]$. At that point in time, the manager node could simply 'steal' the digital assets and end the protocol prematurely. In some embodiments, to ensure the worker nodes that the manager node is honest, the latter creates a protocol rollback transaction, transferring control of digital assets to l different P2SH addresses built in such a way that each worker node has a window of time to retrieve the digital assets if the manager node does not submit the execution transaction. In an embodiment, one or more inputs of the protocol rollback transaction include digital assets (e.g., having a value equal to or based on digital assets transferred to the manager node by the worker nodes in the worker tickets) are usable to transfer control of digital assets controlled by the manager node.

In an embodiment, the manager node 702 constructs a locking script for the protocol rollback transaction using the public keys of each registered worker node $T_i$ included in the redeem script of the worker node's worker ticket $T_x^i$ and constructs the following locking script:

```
# Check if input format is 'sig sig 1' (manager node's option) or
  'sig PubKey 2' (worker nodes' option)
1 OP_EQUAL
OP_IF
    OP_2 T₁ T₂ ... T_l D OP_l + 1 OP_CHECKMULTISIG
    ΔT_E OP_CHECKSEQUENCEVERIFY OP_DROP
    T_i OP_CHECKSIG
OP_ENDIF
```

The above code may be considered one among various implementations of a locking script in which there are two execution paths: a manager node's option and a worker nodes' option. In an embodiment, execution of the manager node's option can be unlocked by providing two inputs, namely the signatures associated to the transaction and two public keys: the public key D and any public key $T_i$, $i \in [1, l]$ generated by the worker nodes. In an embodiment, execution of the worker nodes' can be unlocked after a certain time $\Delta T_E$ has elapsed using two inputs: the signature associated to the transaction and the public key $T_i$ and the public key $T_i$ itself.

In an embodiment, the script includes, as illustrated in FIG. 7, a multisignature subscript. In the context of various blockchain networks, there may be a maximum number of public keys allowed in a multisignature output. To extend the script in cases where a greater number of public keys may need to be checked (e.g., where the number of worker nodes exceeds the maximum number of keys supported in a multisig opcode), the manager node may build a locking script containing several multisignature scripts embedded in if-else statements, the manager node could create several protocol rollback transactions, and so on.

Since both options require two inputs, the two execution paths are differentiated using a third input: 1 for the manager node's option and 2 (or any other number) for the worker nodes' option. To produce the signature associated to a transaction and a public key, a user must know the private key associated to the public key. Although the manager node can build such script, knowing the public key $T_i$ given by a worker node $P_i$, the manager node cannot initially unlock the script, not knowing the private key $y_i$ associated to $T_i$. On the other hand, the worker node $P_i$ can unlock such script after a certain time $\Delta T_E$. Accordingly, in an embodiment, the protocol leaves a window of time $[\Delta T_S, \Delta T_E]$ for the manager node to create the execution transaction and see it confirmed on the blockchain. In various embodiments, the duration of the window can be selected based on various factors, such as an estimated or expected time for transactions to be confirmed to a particular blockchain network.

Figure 8:
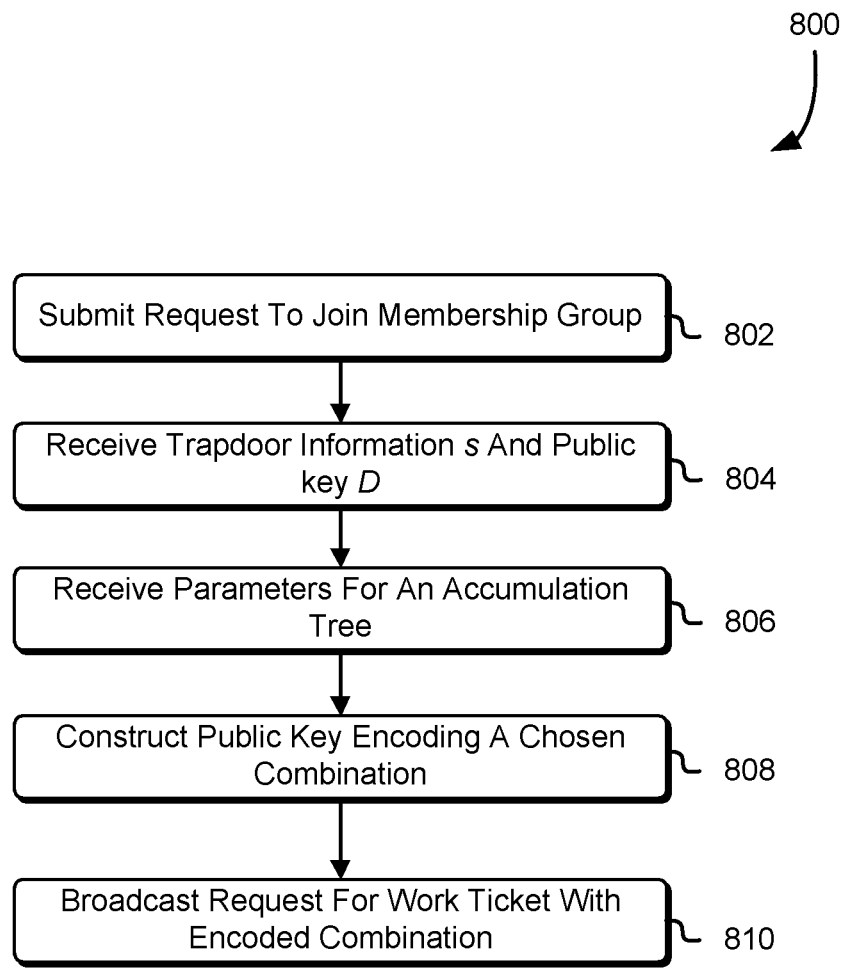
FIG. 8 shows an illustrative example of a process for submitting a request for work ticket or transaction to join a membership group in accordance with an embodiment

FIG. 8 shows an illustrative example of a process 800 for submitting a worker ticket also referred to as a request for work ticket or transaction to join a membership group in accordance with an embodiment. Some or all of the process 800 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The process 800 may be performed by a worker node as described in accordance with this disclosure, such as those discussed in connection with FIG. 1. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 800 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

The system may submit 802 a request to join a membership group. The request may be submitted to a manager node that coordinates the distribution of tasks (e.g., execution of programs) as between a plurality of worker nodes in the membership group. In an embodiment, a manager node broadcasts (e.g., via a blockchain network or any other suitable mechanism) that the manager node is accepting requests to join the membership group and may include additional information such as the registration period is, the maximum number of worker node that can join the membership group before registration closes (which, in some embodiments, accelerates the protocol).

In an embodiment, the system receives 804 trapdoor information s and a public key D from the manager node that coordinates the registration of worker nodes to the membership. In an embodiment, the trapdoor information s and public key D are generated by the manager node using techniques described elsewhere in this disclosure, such as those discussed in connection with FIG. 2.

The system may, separate from or together with step 804, receive 806 a set of parameters for an accumulation tree. Cryptographic accumulators can be used to provide storage of data in a hash table and be used to perform membership authentication. In an embodiment, cryptographic accumulators utilized by one or more worker nodes in group membership registration are static bilinear-map accumulators. In an embodiment, $G_1$, $G_2$ are cyclic multiplicative groups of prime order p with generators $g_1$, $g_2$ and an isomorphism $$\Phi: G_2 \to G_1$$

such that $\phi(g_2)=g_1$. In an embodiment, the set of parameters comprises: a set of N elements $\{e_1, \ldots, e_N\}$; group generator g; a number c of elements where $1<c<N$; and N, the number of elements in the set.

In an embodiment, the system constructs 808 a public key by choosing a combination of c elements among the N elements given in the set of elements, building a local digest representing the c elements chosen, and obtains a point $\Psi$ on an Elliptic Curve calculated based at least in part on the local and global digests. In an embodiment, the worker node $P_i$ computes a new number $c_i$ using a collision-resistant hash function $$h: \mathbb{G} \to \mathbb{Z}_p^*,$$

that is, the hash of the point $\Psi_i$: $c_i=h(\Psi_i)$. This quantity $c_i$, in an embodiment, is considered a private key with an associated public key $V_i$ given by $V_i=c_i \times G$ where G is the generator point of the Elliptic Curve (g=G). Given the homomorphic property of the Elliptic Curve, the worker node $P_i$ computes a new public key $R_i$ given by:

$$R_i=Q_i+V_i=r_i \times G$$

where $r_i=k_i+c_i$ is the private key associated to the public key $R_i$.

In an embodiment, the system generates a second public key $T_i=y_i \times G$ where G is the generator of the Elliptic Curve (g=G) and the two private keys, $k_i$ and $y_i$, verify the following relation: $k_i=y_i$ mod z where z is a large number chosen by the manager node and made publicly available. In an embodiment, the system broadcasts 810 a request for work ticket that includes an input transferring control of digital assets (e.g., as specified by the worker node as a parameter) and a transaction output that includes $R_i$ and $T_i$. The worker ticket may be in accordance with those described in connection with FIG. 2. In an embodiment, a worker node may submit multiple worker tickets generated using different combinations.

Figure 9:
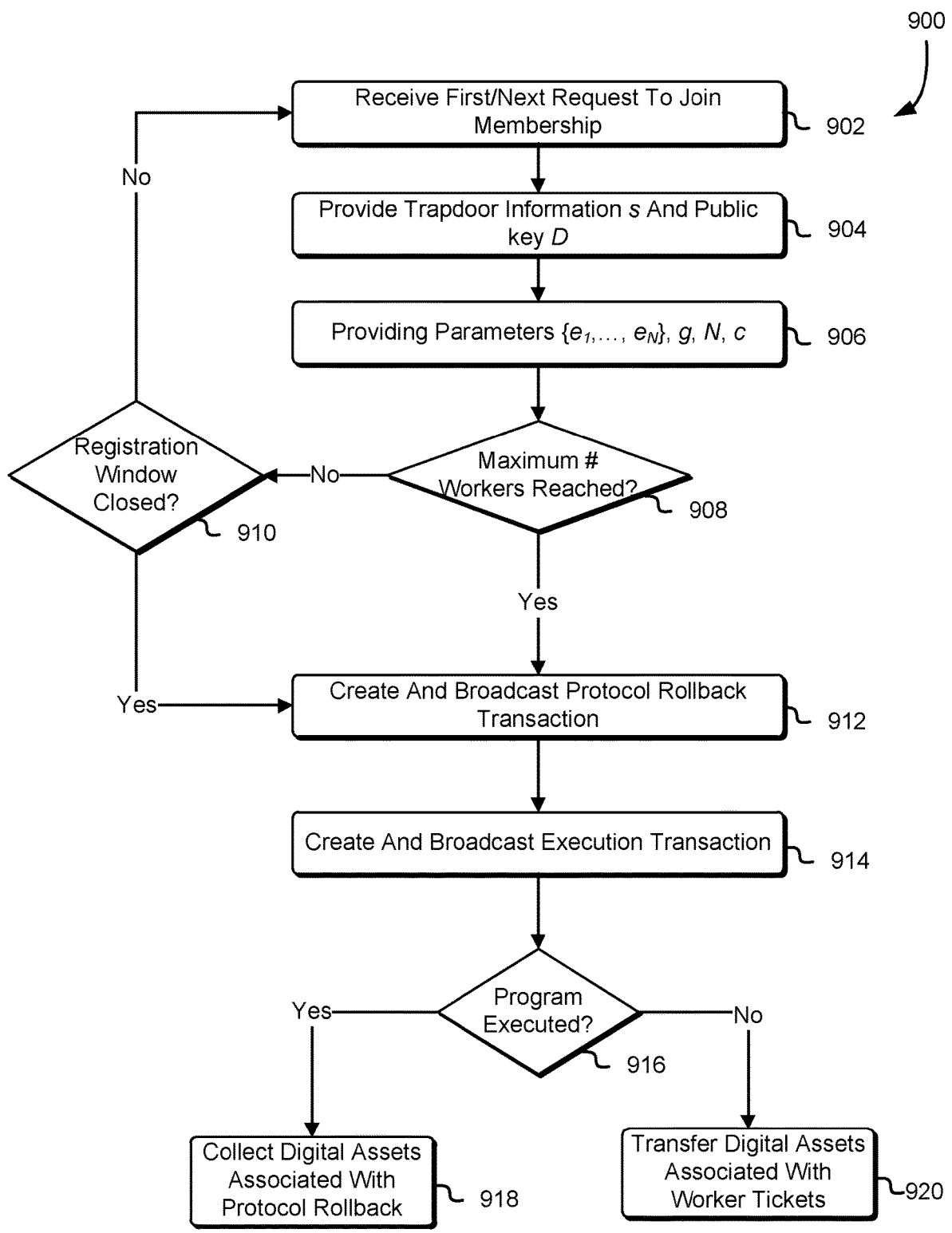
FIG. 9 shows an illustrative example of a process for performing an unbiased distribution of work items (e.g., program execution) among worker nodes of a plurality of worker nodes, according to at least one embodiment.

FIG. 9 shows an illustrative example of a process 900 for performing an unbiased distribution of work items (e.g., program execution) among worker nodes of a plurality of worker nodes, according to at least one embodiment. In some cases, the process 900 is performed at least in part using a manager node described in connection with FIGS. 1-7.

In an embodiment, the manager node publishes or otherwise makes publicly available an indication requesting for worker nodes to register to a group membership. Worker nodes from the group membership may be selected to perform various tasks, such as executing a computer program. In an embodiment, any worker node that submits a request for work ticket may join the group membership and be selected to perform the task. In an embodiment, submission of a request for work ticket includes a transfer of digital assets (e.g., control of digital assets is transferred from a worker node to the manager node).

The system may open registration for group membership for a pre-determined period of time and/or until a maximum number of worker nodes and/or work submission tickets have been received.

In an embodiment, the system receives 902 a request to join a group membership. In an embodiment, the request includes an identifier associated with the group (e.g., the manager node is coordinating the execution of work items across multiple group memberships simultaneously). The system may provide 904 trapdoor information s, public key D as described above. The system may also provide 906 a set of parameters comprising: a set of N elements $\{e_1, \ldots, e_N\}$; group generator g; a number c of elements where $1 < c < N$; and N, the number of elements in the set. The information provided may be used by a worker node to generate an accumulation tree.

The system may receive, at a further point in time, a request for work ticket that includes an indication that a particular node is registering to join the membership group and wishes to be selected to perform a task (e.g., execute a computer program). Each request for work ticket, in an embodiment, includes, for a worker node $P_i$, quantities $R_i$ and $T_i$. In some cases, the work ticket includes a transfer of digital assets from the worker node to the manager node. In an embodiment, the manager node checks whether 908 a maximum number of worker nodes has been reached. The maximum number of workers may be selected based at least in part on various parameters that are tuned so that the probability that any two work tickets include duplicate quantities (e.g., same combination selected in two tickets) is below a certain threshold probability. In an embodiment, the maximum number of worker nodes and/or the number of registered nodes is published and/or updated on a periodic basis.

The system may also check whether 910 the registration window has closed. The registration window may be a time that indicates when a node is to be selected to execute a task. In some cases, such as when the group membership has been filled, the registration window may be closed ahead of the initially determined registration deadline (e.g., the deadline is merely the latest time in which the protocol is to advance to the worker selection stage). In an embodiment, the determination as to whether the maximum number of workers has been reached and the determination as to whether the registration window is closed may be performed in a parallel or non-deterministic ordering.

The system may, after determining that the registration phase has ended (e.g., because the registration window has passed or a maximum number of nodes have registered), the system may continue to a selection phase wherein a worker node is selected to execute a computational task (e.g., execute a computer program). The system may create 912 and broadcast, to the blockchain, a protocol rollback transaction as described in FIG. 7. In some embodiments, the broadcasting of the protocol rollback transaction must occur before a certain time $\Delta T_S$, otherwise the request for work tickets may be rolled back (e.g., by executing instructions included in the tickets that can be executed to roll back operations operation after the prescribed time $\Delta T_S$, such as rolling back the transfer of digital assets by re-transferring the digital assets back to the worker nodes). It should be noted that, in some embodiments, the protocol rollback transaction is not needed, such as in computing environments where there are additional trust constraints around the operation of the manager node—for example, if the manager node is operated or controlled by a government or other such organization, worker nodes may have sufficient trust that the government will operate according to the protocol and/or have off-chain remedies that may be enforced against the government if it fails to follow the protocol.

In an embodiment, an execution transaction is created 914 and broadcasted according to techniques described in accordance with FIGS. 4-6. The worker node may create the execution transaction within a window of time $[\Delta T_S, \Delta T_E]$. As part of this process, the system may randomly select c of N elements. It should be noted that in an embodiment, the system can only draw an unbiased combination of c elements because the system lacks additional knowledge that can be used to deduce the quantities chosen by various worker nodes to verify whether the combination selected by the system matches the combination selected by any other worker node. In an embodiment, the execution transaction includes a work item. In an embodiment, the work item is at least part of a computer program that is executable by a worker node of the group membership that chose and submitted a request for work ticket having the same combination. Once the execution transaction is broadcast to the blockchain network, worker nodes may attempt to execute the program.

The system may, at a predetermined time, determine whether 916 the program has been executed. In an embodiment, if the program has been executed, the manager node claims 918 the digital assets encumbered by the protocol rollback transaction. If the program was not executed by the prescribed time, then the system may collect 920 the digital assets encumbered by the worker tickets and each of the worker nodes may claim a portion of the digital assets encumbered by the protocol rollback transaction as a rollback mechanism. In an embodiment, such as those where there is no protocol rollback transaction, the case where the program was not executed may result in the worker nodes each claiming a portion of the digital assets encumbered by the execution transaction instead.

Figure 10:
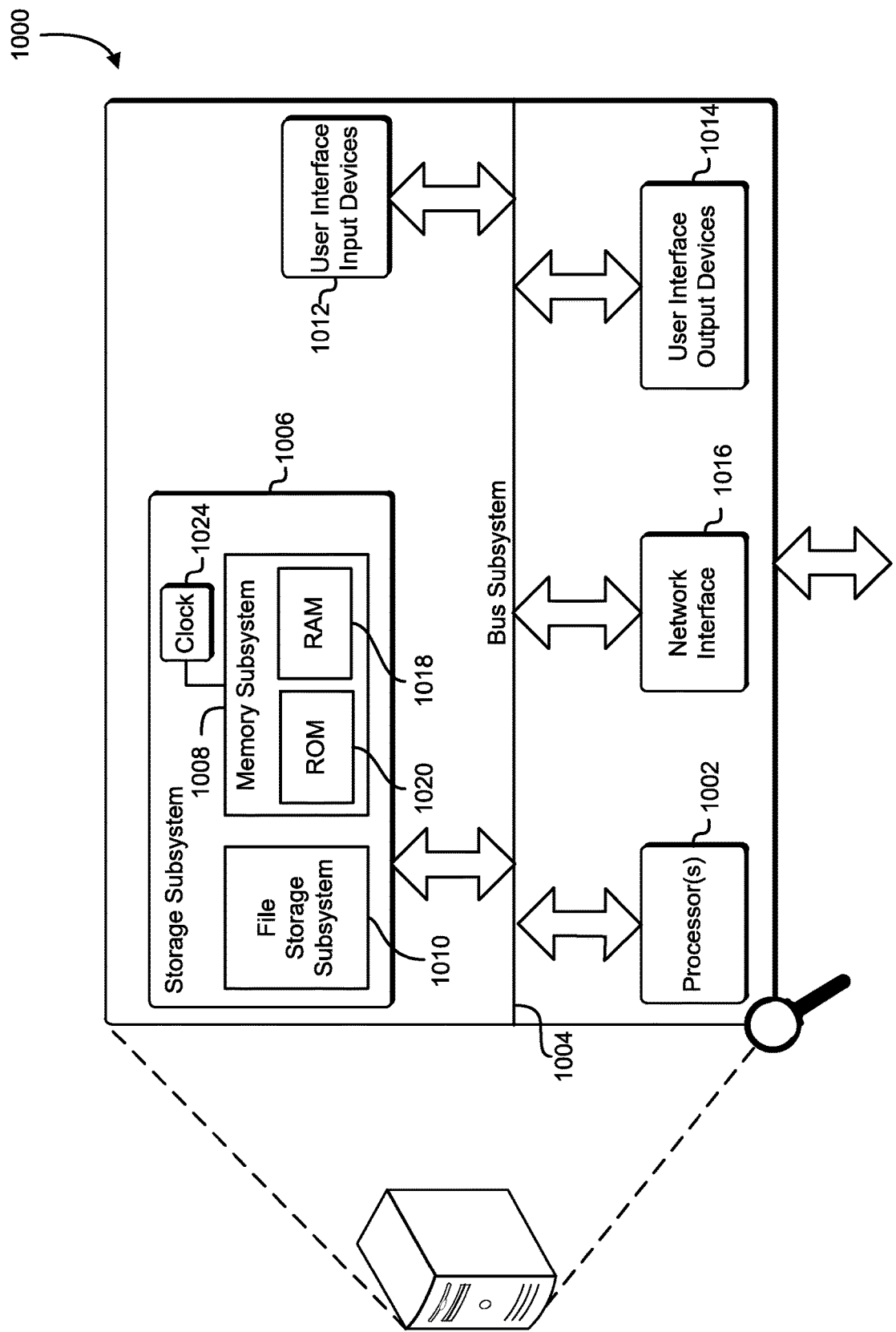
FIG. 10 illustrates a computer system in which various embodiments can be implemented.

FIG. 10 is an illustrative, simplified block diagram of a computing device 1000 that can be used to practice at least one embodiment of the present disclosure. In various embodiments, the computing device 1000 can be used to implement any of the systems illustrated and described above. For example, the computing device 1000 can be configured for use as a data server, a web server, a portable computing device, a personal computer, or any electronic computing device. As shown in FIG. 10, the computing device 1000 could include one or more processors 1002 that, in embodiments, are configured to communicate with and are operatively coupled to a number of peripheral subsystems via a bus subsystem 1004. In some embodiments, these peripheral subsystems include a storage subsystem 1006 comprising a memory subsystem 1008 and a file/disk storage subsystem 1010, one or more user interface input devices 1012, one or more user interface output devices 1014, and a network interface subsystem 1016. Such storage subsystem 1006 could be used for temporary or long-term storage of information.

In some embodiments, the bus subsystem 1004 provides a mechanism for enabling the various components and subsystems of computing device 1000 to communicate with each other as intended. Although the bus subsystem 1004 is shown schematically as a single bus, alternative embodiments of the bus subsystem utilize multiple buses. In some embodiments, the network interface subsystem 1016 provides an interface to other computing devices and networks. The network interface subsystem 1016, in some embodiments, serves as an interface for receiving data from and transmitting data to other systems from the computing device 1000. In some embodiments, the bus subsystem 1004 is utilised for communicating data such as details, search terms, and so on.

In some embodiments, the user interface input devices 1012 includes all possible types of devices and mechanisms for inputting information to the computing device 1000. In some embodiments, the one or more user interface output devices 1014 includes all possible types of devices and mechanisms for outputting information from the computing device 1000. The one or more user interface output devices 1014 can be used, for example, to present user interfaces to facilitate user interaction with applications performing processes described and variations therein, when such interaction may be appropriate.

In some embodiments, the storage subsystem 1006 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1006. These application modules or instructions can be executed by the one or more processors 1002. In various embodiments, the storage subsystem 1006 additionally provides a repository for storing data used in accordance with the present disclosure. In some embodiments, the storage subsystem 1006 comprises a memory subsystem 1008 and a file/disk storage subsystem 1010.

In embodiments, the memory subsystem 1008 includes a number of memories, such as a main random access memory (RAM) 1018 for storage of instructions and data during program execution and/or a read only memory (ROM) 1020, in which fixed instructions can be stored. In some embodiments, the file/disk storage subsystem 1010 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1000 includes at least one local clock 1024. The local clock 1024, in some embodiments, is a counter that represents the number of ticks that have transpired from a particular starting date and, in some embodiments, is located integrally within the computing device 1000. In various embodiments, the local clock 1024 is used to synchronize data transfers in the processors for the computing device 1000 and the subsystems included therein at specific clock pulses and can be used to coordinate synchronous operations between the computing device 1000 and other systems in a data centre. In another embodiment, the local clock is a programmable interval timer.

Due to the ever-changing nature of computers and networks, the description of the computing device 1000 depicted in FIG. 10 is intended only as a specific example for purposes of illustrating the preferred embodiment of the device. Many other configurations having more or fewer components than the system depicted in FIG. 10 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. The mere fact that certain measures are recited in mutually different dependent claims does not indicate that a combination of these measures cannot be used to advantage.

The invention claimed is:

1. A computer-implemented method comprising:
    detecting that a plurality of transactions on a blockchain satisfies a condition, wherein the plurality of transactions comprises a first transaction corresponding to a first public key and a second public key, wherein the first public key encodes a first set of elements of a hierarchical data structure;
    generating a third public key based on a second set of elements of the hierarchical data structure;
    generating a second transaction based at least in part on the first public key, the second public key, and the third public key, wherein the second transaction encodes at least part of a computational task; and
    contingent upon the first set of elements matching the second set of elements, causing a node of the blockchain to execute the computational task by at least verifying that the node has access to a first private key and a second private key, wherein the first private key and the first public key form a first key pair and the second private key and the second public key form a second key pair, wherein the first public key, the second public key, and the third public key refer to points on an elliptic curve.

2. The method according to claim 1, wherein verifying that the node has access to the first private key and the second private key comprises verifying that the first private key and the second private key satisfy a modulus relationship.

3. The method according to claim 1, further comprising making available a set of parameters usable to determine a structure of the hierarchical data structure.

4. The method according to claim 3, wherein the condition is a threshold time passing, wherein the threshold time is indicated in the set of parameters.

5. The method according to claim 1, wherein the hierarchical data structure is a bilinear-map accumulation tree.

6. The method according to claim 1, wherein the condition is the plurality of transactions reaching a maximum threshold number.

7. The method according to claim 6, wherein:
    the hierarchical data structure is an accumulation tree; and
    a number of leaf nodes of the accumulation tree, a number of elements in the first set of elements, and the maximum threshold number are collectively determined based at least in part on a probability that two or more transactions of the plurality of transactions encode a same set of elements.

8. The method according to claim 1, wherein:
    the second transaction encumbers a set of digital assets, wherein the set of digital assets is determined based at least in part on digital assets encumbered by each of the plurality of transactions; and
    the computational task, if executed, transfers control of at least part of the set of digital assets.

9. The method according to claim 1, further comprising, based on detecting satisfaction of the condition, broadcasting an assurance to generate the second transaction, wherein the assurance encumbers a second set of digital assets based on digital assets encumbered by the plurality of transactions.

10. The method according to claim 1, wherein transactions of the plurality of transactions are broadcast to the blockchain by different nodes of the blockchain.

11. The method according to claim 1, wherein at least two transactions of the plurality of transactions are broadcast to the blockchain by a node of the blockchain.

12. The method according to claim 1, wherein the computational task is to be executed within a specified time duration.

13. A system, comprising:
    a processor; and
    memory including executable instructions that, as a result of execution by the processor, cause the system to perform the computer-implemented method of claim 1.

14. A system, comprising:
    a processor; and
    memory including executable instructions that, as a result of execution by the processor, cause the system to perform the computer-implemented method of claim 2.

15. A system, comprising:
    a processor; and
    memory including executable instructions that, as a result of execution by the processor, cause the system to perform the computer-implemented method of claim 3.

16. A non-transitory computer-readable storage medium having stored thereon executable instructions that, as a result of being executed by a processor of a computer system, cause the computer system to at least perform the computer-implemented method of claim 1.

17. A non-transitory computer-readable storage medium having stored thereon executable instructions that, as a result of being executed by a processor of a computer system, cause the computer system to at least perform the computer-implemented method of claim 2.

* * * * *